Dec. 27, 1927.　　　　　　　　　　　　　　　　　　　　1,654,304
R. C. MUNRO
CARLINE
Filed Dec. 7, 1922
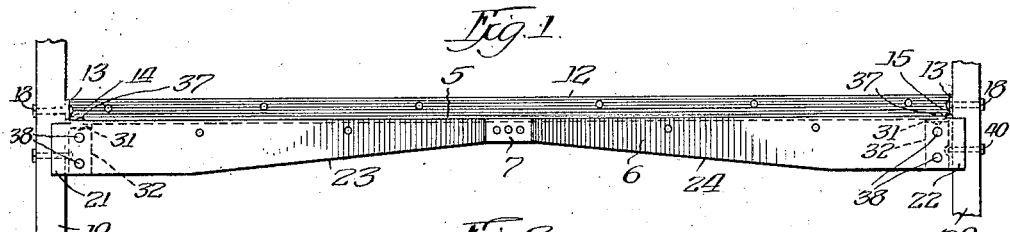
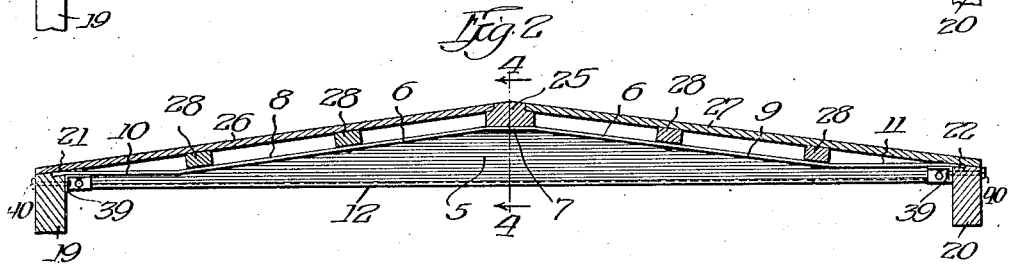
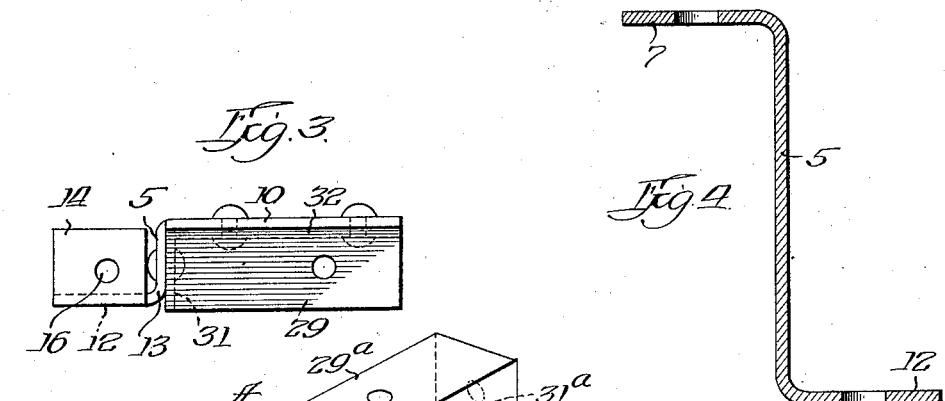
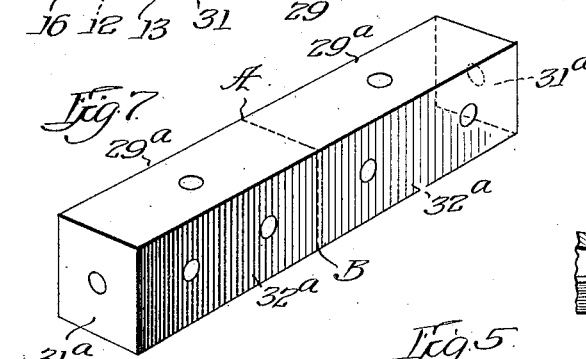
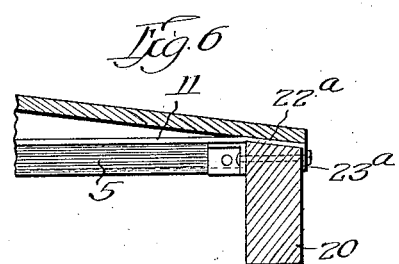
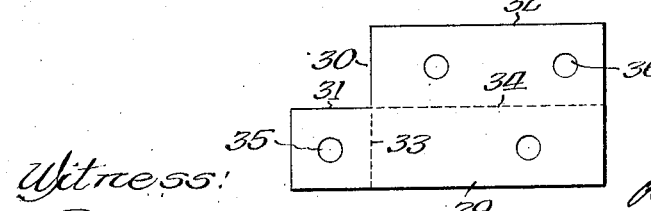
Witness:　　　　　　　　　　　　　　　　　Inventor
　　　　　　　　　　　　　　　　　　　　　Ray C. Munro Patented Dec. 27, 1927.

1,654,304

UNITED STATES PATENT OFFICE.

ROY C. MUNRO, OF CHICAGO, ILLINOIS, ASSIGNOR, BY MESNE ASSIGNMENTS, TO CHICAGO-CLEVELAND CAR ROOFING COMPANY, OF CHICAGO, ILLINOIS, A CORPORATION OF DELAWARE.

CARLINE.

Application filed December 7, 1922. Serial No. 605,402.

This invention relates in general to car construction and more particularly to the bodies thereof, and has especial reference to improvements in the carlines used in framing car roofs.

While this invention is illustrated as a carline especially adapted for use in the body structure of freight cars, it is to be understood that this device may be elsewhere conveniently employed, and, therefore, finds a wide field of utility for purposes other than that herein described and illustrated.

The principal objects and advantages which characterize this invention reside in the provision, in a car body construction involving the use of metallic members, of a carline wherein a given weight and quantity of metal or other suitable material is most advantageously employed in the production of a car body of maximum rigidity and strength, a minimum of weight, simplicity of manufacture, avoidance of waste of material, and low cost; the provision of a carline which, in itself, affords an article of manufacture which is characterized by the features of simplicity, strength, low cost of manufacture, low weight proportional to strength, and a high degree of durability; the provision of an improved carline construction which is adaptable for employment as a component part of either the side or end plate construction of a car body; the provision of an improved carline construction characterized by the embodiment therein of an improved arrangement of the portions of the carline whereby to attain a high degree of strength and rigidity at the medial portion of the carline without employment of a great amount of metal; the provision of an improved carline characterized by the feature whereby the weight of the carline at its medial portion and, consequently, the strain exerted by such weight, are reduced to a minimum compatible with sound construction; the provision of an improved carline having a shape affording all the advantages of a truss-built beam without the attendant cost of manufacture and other disadvantages of such truss beam in order to secure the greatest strength and rigidity of the carline at its medial portion and attain the greatest resistance to all bending moments and other stresses to which the roof and the supporting carline, or carlines, may be subjected in service; and the provision of such an improved carline construction having the features and advantages pointed out above, in combination with an improved anchoring means for securing the carline fixedly to the side plates of the car body.

This invention is further characterized by the provision of a carline embodying an improved end construction, that is, the ends of the carline being so constructed as to facilitate the convenient securement of the carline to the side plates; and the provision of improved securing means, hereinafter described as brackets, for attaching and reinforcing the carline and the side plates where these two elements are joined.

The foregoing and such other objects and advantages as may appear as this description proceeds are attained in one structural embodiment of this invention illustrated in the accompanying drawing, in which Figure 1 is a top plan view of a carline embodying the improvements of this invention and illustrated as applied in a car construction;

Figure 2 is a fragmentary sectional view through a railway car body illustrating a roof construction embodying the improved carline of this invention;

Figure 3 is an enlarged end elevational view of the carline and one of its brackets;

Figure 4 is an enlarged vertical sectional view taken on the line 4—4 of Figure 2, looking in the direction indicated by the arrows;

Figure 5 is an elevational view of a detail;

Figure 6 is fragmentary sectional view of modified form; and

Figure 7 is a perspective view of a further modified form of a part of this invention.

Referring first, more particularly to Figures 1 and 2 of the drawing, the device of this invention conveniently is formed from a sheet of metal of suitable thickness and rigidity, which sheet may be rectangular, or any other convenient shape, and formed under pressure, or in any other suitable manner, to provide a flat vertical web 5, the upper portion of said web being formed to provide a continuous lateral flange 6, the forming of such flange being such that it is provided with a medial top flat portion 7, oppositely inclined portions 8 and 9 extending toward the opposite ends of the carline and near such ends said flange being flattened as at 10 and 11.

The lower portion of the web 5 is bent laterally in an opposite direction to that of the flange 6 so as to form a continuous flange 12 of uniform width and extending in a fixed horizontal plane from end to end of the carline. The flange 12 is provided with extended portions beyond the end edges 13—13 of the vertical web 5 and said extensions are bent conveniently upwardly at 14 and 15 and apertured at 16 to receive bolts or other fastening elements, indicated at 18, which pass transversely through the side plates indicated at 19 and 20.

The top flange 6 forms in effect a compression surface or shelf and the bottom flange 12 forms in effect a tension surface or shelf, and the top flange has extending end portions 21 and 22, (Figures 1 and 2) slightly bent downwardly to engage and seat upon the upper outwardly inclined surfaces of the side plates 19 and 20, respectively.

The inclined portions 8 and 9 of the flange 6 are of gradually increasing area from the medial flat portion 7 toward the flat portions 10 and 11, as best seen in Figure 1, this being accomplished by cutting or otherwise removing the metal of the flange 6 along the lines 23 and 24, Figure 1. It will thus be seen that the vertical web takes a form which is of gradually decreasing depth from the medial toward the end portions of the car and that the medial portion of the carline, which must possess a high degree of strength and rigidity, is given these qualities by virtue of the depth of the web at the medial portion. Furthermore, the removal of the surplus metal of the flange 6 along the lines 23 and 24 affords the necessary strength with the advantage of permitting a reduction in weight without sacrificing such strength. It will be observed further that due to the form of the carline the sum of the widths of the flanges 6, 12, and the web, transversely of the carline will be generally substantially the same, throughout the length of the carline.

The arrangement of the inclined portions 8 and 9 and the disposition of the extending portions 21 and 22 is such that the desired sloping of the roof boards is conveniently attained.

In applying the roof, the ridge pole 25 is conveniently secured to the flat portion 7 of the compression surface in any suitable manner, such as by bolts or the like, and the roof, comprising the two sections 26 and 27, is secured to the ridge pole and supported on and secured to the purlins 28—28, which latter are in turn supported upon and secured to the portions 8 and 9 of the compression flange.

The roof boards extend out over the extensions 21 and 22 and may be secured in any desired manner to the side plates.

For reinforcing and for fixedly attaching the ends of the carline to the side plates, in addition to the lugs or upwardly bent extensions 14 and 15, I provide an improved bracket which, as best seen in Figure 5, is formed conveniently of a blank of metal to form a body portion 29, cut and formed to afford an end lug 31 and a flange 32, said lug and flange lying in angularly related planes. The lug 31 is bent laterally of the body 29 along the line 33, and the flange 32 is bent in the same direction as the lug 31 along the line 34, so that a box-like structure is provided, as best seen in Figures 1 and 2. The lug 31 is provided with an aperture 35 and the lug 32 is provided with apertures 36.

When the bracket is properly formed, and prior to the installation of the carline, the lug 31, by virtue of the aperture therein, is secured by means of a rivet 37 to the end portion of the web 5, and the flange 32 is similarly secured by rivets 38 to the under surface of the compression flange, the extensions 21 and 22 lying beyond the body 29 of the bracket, as best seen in Figure 2. The body of the bracket is provided with an aperture 39, through which said aperture and the side plate, a bolt 40 may pass for fixedly securing the bracket to the side plate.

Referring now to Figure 6, the structure here may be substantially identical with that hereinbefore described, with the additional feature of the members 21ª and 22ª, which latter are extended over the side plates, and bent downward as at 23ª along the outer surfaces of the side plates.

Referring to Figure 7, a modified form of the bracket is shown, the variation here over that previously described residing particularly in the mode of construction of the bracket. In this form of the bracket the element is formed from a plain sheet of metal of the required size and rigidity, and may conveniently, while hot, be bent to form the body 29ª, flange 32ª and end lug 31ª, the blank of metal being preferably of sufficient length, and after formation into a box-like shape, cut along the dotted line A—B to thus produce two brackets. I find that the metal, while hot, will readily, under pressure, form the end lug, body and flange of the bracket integral, thereby affording an article of great strength and rigidity and which may be manufactured at low cost.

From the foregoing description it will be observed that due to the formation of the carline, it is possessed of a high degree of strength at its medial portion at which the greatest strain more often occurs, and that due to the construction of the bracket, and the overlapping extensions 21 and 22, but two bolts are required for adequate securement of the carline to the side plates. Thus, I am not only enabled to materially reduce the cost of manufacture, reduce the weight without a loss of strength, but also provide a device of the character described which may be conveniently installed.

Having thus described my invention and illustrated its use, what I claim as new and desire to secure by Letters Patent is:

1. In combination with side plates of a railway car, a carline formed as a beam comprising a web having a compression flange including two oppositely inclined portions extending beyond the ends of the web to overlie the side plates, and brackets for securing the carline to the side plates, each of said brackets comprising a portion secured to a side plate and a portion secured to said compression flange on said web.

2. In combination with the side plates of a railway car, a carline formed as a beam comprising a web having a base flange, a top flange having oppositely inclined portions which are extended beyond the ends of the webs to overlie the side plates, and brackets for securing said carline to the side plates, each of said brackets comprising a portion affixed to a side plate and portions affixed to said web and top flange.

3. In combination with the side plates of a railway car, a carline formed as a beam comprising a web having a compression flange which has its maximum height at the medial portion of the beam and is of increasing area from the middle of the beam toward the ends, said compression flange overlying the car side plates, and brackets secured to the side plates and secured to the web and compression flange of the carline.

4. In combination with the side plates of a railway car, a carline formed as a beam having a compression flange which has its maximum height at the medial portion of the beam and is of increasing area from the middle of the beam toward the ends, said compression flange overlying the car side plates and brackets secured to the side plates and to the underside of said flange.

5. In combination with the side plates of a railway car a carline comprising a beam of generally Z-shaped cross-section at its medial portion, and provided with a flat vertical web, a continuous tension flange of uniform width throughout, and a continuous compression flange on said web provided with oppositely inclined portions, and brackets for connecting said carline to the side plates comprising each a body connected to a side plate and portions connected to said web and compression flange, respectively.

6. In combination with the side plates of a railway car, a carline formed as a beam comprising a web having a compression flange which has its maximum height at the medial portion of the beam and is of increasing area from the middle of the beam toward the ends, said compression flange overlying the car side plates and bent to straddle same, and brackets secured to the side plates and secured to the web and compression flange of the carline.

7. In combination with the side plates of a railway car, a carline formed as a beam having a compression flange which has its maximum height at the medial portion of the beam and is of increasing area from the middle of the beam toward the ends, said compression flange being extended and bent to overlie and straddle the car side plates and brackets secured to the side plates and to the underside of said flange.

8. In a device of the character described, the combination with the side plates of a railway car of a carline including a vertical web having compression and tension flanges, and a bracket for securing said carline to a side plate, said bracket comprising a body, a longitudinal lateral flange on said body, and said body and flange being secured to said web and one of said first mentioned flanges, and an end lug on said body for securement to the side plate.

ROY C. MUNRO.